US006584251B1

(12) United States Patent
Ardouin

(10) Patent No.: US 6,584,251 B1
(45) Date of Patent: Jun. 24, 2003

(54) SOLID STRANDING FLEXTUBE UNIT

(75) Inventor: Pascal Ardouin, Marseilles (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/576,173

(22) Filed: May 23, 2000

(51) Int. Cl.[7] .................................................. G02B 6/44

(52) U.S. Cl. ....................... 385/100; 385/102; 385/109; 385/111; 385/113

(58) Field of Search ................................ 385/100, 102, 385/104, 109, 111, 113

(56) References Cited

U.S. PATENT DOCUMENTS

| | | | | |
|---|---|---|---|---|
| 4,171,609 A | 10/1979 | Feese | | |
| 4,909,593 A | 3/1990 | Harbort et al. | | |
| 4,956,039 A | 9/1990 | Olesen et al. | | |
| 4,997,258 A | 3/1991 | Oestreich | | |
| 5,155,789 A | 10/1992 | Le Noane et al. | | |
| 5,247,599 A | 9/1993 | Vyas et al. | | |
| 5,283,014 A | 2/1994 | Oestreich et al. | | |
| 5,345,531 A | 9/1994 | Keplinger et al. | | |
| 5,487,126 A | 1/1996 | Oestreich et al. | | |
| 5,528,718 A | 6/1996 | Ray et al. | | |
| 5,542,020 A | 7/1996 | Horska | | |
| 5,621,841 A | 4/1997 | Field | | |
| 5,671,312 A | 9/1997 | Jamet | | |
| 5,694,510 A | * 12/1997 | Sano et al. | ................. | 385/113 |
| 5,734,126 A | 3/1998 | Siekierka et al. | | |
| 5,821,467 A | 10/1998 | O'Brien et al. | | |
| 5,905,834 A | 5/1999 | Anderson et al. | | |
| 5,938,987 A | 8/1999 | Paivinen | | |
| 5,970,196 A | 10/1999 | Greveling et al. | | |
| 6,195,487 B1 | * 2/2001 | Anderson et al. | ........... | 385/101 |
| 6,205,276 B1 | * 3/2001 | Anelli et al. | ................ | 385/100 |
| 6,226,430 B1 | * 5/2001 | De Castro et al. | .......... | 385/113 |
| 6,243,519 B1 | * 6/2001 | Ishikawa et al. | ............ | 385/111 |
| 6,259,844 B1 | * 7/2001 | Logan et al. | ............... | 385/113 |
| 6,311,000 B1 | * 10/2001 | Schneider | ................... | 385/113 |
| 6,317,542 B1 | * 11/2001 | Hardwick, III et al. | | |
| 6,349,161 B1 | * 2/2002 | Gleason et al. | ............. | 385/113 |

FOREIGN PATENT DOCUMENTS

| | | | | |
|---|---|---|---|---|
| EP | 0 522 320 B1 | 1/1993 | | |
| EP | 0 846 970 A1 | 12/1996 | | |
| EP | 1160606 A2 * | 5/2001 | ............ | G02B/6/44 |

* cited by examiner

*Primary Examiner*—Akm E. Ullah
*Assistant Examiner*—Jennifer Doan
(74) *Attorney, Agent, or Firm*—Sughrue Mion, PLLC

(57) ABSTRACT

A solid-stranding method and apparatus for forming optical cables. Solid-stranding combines buffering and stranding operations, as well as performs the stranding operation while the flextubes are still hot so that they adhere together without additional binders. Optical fibers and/or wires are supplied to an extruder which forms flextubes around individual ones or groups of the optical fibers and/or wires. A central element may be supplied to, and go through, the center of the extruder. A rotating pulling device, such as a caterpillar, helically or in an SZ-manner solid-strands the flextubes around the central element—or solid-strands the flextubes to themselves when no central element is present—as the flextubes cool down. That is, solid-stranding includes buffering and stranding operations that are performed together without a water cooling stage therebetween. Thus, the flextubes adhere together, and may adhere to the central member, thereby forming a solid-stranded composite core.

15 Claims, 3 Drawing Sheets

SOLID STRANDING FLEXTUBE UNIT

BACKGROUND

1. Field of the Invention

The present invention is directed to a method and apparatus for manufacturing optical cables and, in particular, optical cables which include flextubes having optical-fibers therein.

With the advent of local area networks and the relative broadband capabilities of fiber optic links, it has become commonplace for new communication systems to include fiber-optic capabilities. Communication cables employing optical fibers—optical cables—are widely used in the telecommunications industry. In particular, multifiber optical cables are widely used for long distance telephone communications, interexchange telephone applications, and other telephony and data transmission applications. Optical cables are also being incorporated into cable television networks in place of more traditional coaxial cables. Optical cables may permit long distances between signal repeaters or eliminate the need for such repeaters altogether. In addition, optical fibers offer extremely wide bandwidths and low noise operation.

2. Related Art

In the use of optical fibers, optical cables are provided for physical protection of the fibers in view of the fragile nature of the glass optical fibers. An optical cable may contain many optical fibers which must be identified and manipulated without disturbing other optical fibers within the optical cable. Therefore, optical cables may have various internal structures. The structure families which are currently being used are tight tube, monotube, slotted core, and loose tube.

In the tight buffer tube construction, protective layers are applied in direct contact with each optical fiber so there is no fiber overlength. In such a tight buffered construction, each optical fiber has one or more completely encapsulating layers in order to provide mechanical protection. The protective layers may be made of thermoplastic or other suitable materials. The protective layers typically have material properties which give the buffered fiber good mechanical and thermal performance. The value of cable tensile elongation for the buffered fiber is typically less than 0.15% in order to provide low attenuation increase at low temperatures.

In the monotube structure, all of the optical fibers are housed in a single, centrally located, gel filled, oversized, thermoplastic, buffer tube. The optical fibers may be loosely configured, grouped in bundles wrapped by binders, or held in a matrix by ribbons. The hollow buffer tube is typically filled with a thixotropic gel which blocks water penetration, but allows for fiber movement during cable expansion or contraction. A precise amount of fiber overlength within the buffer tube is required in order for the fibers to maintain a virtual stress-free condition during cable expansion. The amount of overlength is typically within 0.1–0.2% of the value for the amount of cable tensile elongation.

The slotted core structure has optical fibers precisely placed in gel filled channels or slots. The channels are symmetrical and form a helical path along the longitudinal axis of the cable. A strength member is located in the center of the slotted core cable structure. That is, in the slotted core construction of optical cable, a profile member is extruded around a central strength member made of metallic or dielectric material. A plurality of slots or grooves which follow a helical or reversing helical path are located on the outer surface of the thermoplastic profile member. One or more optical fibers lay in the slots in a virtual stress-free condition. The optical fibers may be loosely configured, grouped in bundles wrapped with binders, or held in a ribbon matrix.

Finally, in a loose tube or flextube structure, several buffer tubes containing optical fibers are stranded around a central strength member. The buffer tubes are then typically bound together with a separate binder before being enclosed within a common sheath. With respect to identifying and manipulating the optical fibers without disturbing or damaging other optical fibers within a cable, the loose tube or flextube structure offers advantages over the monotube. A single buffer tube may be accessed in the loose tube or flextube structure while the remainder of fibers within other buffer tubes are undisturbed. In contrast, entry into the single central monotube is likely to increase the risk of damaging adjacent fibers because all of the fibers are contained within the single monotube.

Loose tubes include extruded cylindrical tubes—called buffer tubes—which enclose optical fibers in a cable. The optical fibers enclosed within a loose tube may be in the form of single optical fibers, optical-fiber ribbons, or any other configuration of optical fibers, which are simply referred to hereinafter as optical fibers for convenience. The buffer tubes serve many purposes, for example: providing physical protection to the optical fibers; protecting the optical fibers from contaminants; containing water blocking materials; isolation of the optical fibers into groups; strengthening the cable to resist crushing forces; and providing room for optical fibers to move when the cable is bent and when tension is applied to the cable.

In conventional methods, individual loose tubes are first formed, as in a buffering process, and they are then stored as an intermediate product, for example on a plate or drum. A plurality of these loose tubes are then stranded together—in a separate stranding process which often takes place in a different location—to form an optical-fiber cable, or loose tube unit. An example of this type of method is disclosed in U.S. Pat. Nos. 5,938,987 and 4,171,609, wherein the former discloses a method by which individual loose tubes are formed, i.e., a buffering step, and the latter discloses a method by which individual preformed loose tubes are stranded together, i.e., a separate stranding step. However, winding the loose tubes onto a drum or depositing the loose tubes represents additional work outlay and cost. Further cost is associated with storage and transportation of the individual loose tubes to the stranding location.

U.S. Pat. No. 5,283,014 attempts to solve the problems of using separate process lines and/or locations to first form individual loose tubes (buffering) and then strand them together. This patent consecutively disposes buffering and stranding lines so that individual loose tubes are formed, are cooled so as to solidify, and are then stranded together along one process line, thereby avoiding storage and transportation costs involved in other conventional methods. However, the buffering and stranding processes are still separate and, therefore, this process still suffers drawbacks associated with separate buffering and stranding processes, such as high cooling costs and low line speeds as it completely cools the loose tubes before it strands them together. Further, the loose tubes are bound together with a separate binder before being enclosed within a common sheath, thereby adding process time as well as expense.

Flextubes are similar to loose tubes in that they contain a supporting sheath which surrounds optical fibers in a cable.

The optical fibers enclosed within a flextube may be in the form of single optical fibers, optical-fiber ribbons, or any other configuration of optical fibers, simply referred to hereinafter as optical fibers for convenience. The supporting sheaths of flextubes serve many purposes, for example: providing physical protection to the optical fibers; protecting the optical fibers from contaminants; containing water blocking materials; isolation of the optical fibers into groups; and strengthening the cable to resist crushing forces.

Although flextubes are similar to loose tubes, they have several differences. In particular, flextubes for a given number of optical fibers have an outside diameter which is smaller than that for a loose tube having the same number of optical fibers. In other words, the supporting sheath of a flextube lies more tightly around the optical fibers than does a buffer tube of a loose tube. That is, the supporting sheath is disposed in contact with the optical fibers so as to surround them in such a manner as to achieve mechanical coupling between the optical fibers. Alternatively, there may be a very small space between the supporting sheath and some of the optical fibers therein. Further, the supporting sheath is more flexible than a buffer tube, and is not necessarily cylindrical as is a buffer tube. That is, the supporting sheath conforms to the optical fibers which it surrounds, whereas a buffer tube is a rigid cylinder having the optical fibers therein. Because of the manner in which flextubes are formed, they are lighter in weight and smaller in size than their loose tube counterparts. Further, because the supporting sheaths are more flexible than buffer tubes, it is easier to access—without special tools—the optical fibers within a flextube than it is to access the optical fibers within a loose tube. That is, the supporting sheaths may be easily removed with bare fingers or by simple tube access tools.

Despite the differences between flextubes and loose tubes, flextubes are formed into optical-fiber cables in a similar manner as described above for loose tubes. Accordingly, the heretofore methods of producing flextubes into flextube units or optical cables suffer the same disadvantages noted above for the production of loose tubes into optical cables.

SUMMARY OF THE INVENTION

An object of the present invention is to overcome the disadvantages of the related art. In particular, it is an object of the present invention to increase line speed and decrease cost in the production and use of flextube units, or optical cables.

The present invention achieves the above and other objects and advantages by providing a new process, in manufacturing optical cables, called solid-stranding. The process of solid-stranding is a one-step process for extruding multiple loose tubes or flextubes (hereinafter simply referred to as flextubes for convenience) and stranding the tubes in helical or SZ stranded arrangement prior to winding the optical cable on a take-up reel. The method and apparatus of the present invention, for solid-stranding, combine together buffering and stranding operations, as well as perform the stranding operation while the supporting sheaths of the flextubes are still hot so that they adhere together without additional binders. In particular, optical fibers and/or wires are supplied to an extruder which forms supporting sheaths around individual ones or groups of the optical fibers and/or wires. A central element is supplied through the center of the extruder. A rotating pulling device, such as a caterpillar, helically strands the flextubes around the central element as the sheaths cool down. That is, in the new solid-stranding process of the present invention, buffering and stranding operations are performed together without a cooling stage therebetween so that the flextubes contact one another and the central element at a temperature which is between the process temperature and the melting point of the material from which the flextubes are made. The process temperature is that of the material in the extruding die and, typically, is 20–50° C. above that material's melting point, wherein the melting point is typically a range of temperatures over which the material melts. Although the melting point is actually a range of temperatures over which the material melts, the term "melting point" is used for convenience. Thus, because the flextubes are brought together at a temperature which is between the process temperature and the melting point, they adhere together forming a composite core. The composite core then may be jacketed by passing through another extruder, or may be used without a jacket, thereby forming a flextube unit from which individual flextubes easily may be split.

Because there is no need to completely cool the flextubes before they are stranded, and the flextubes have a relatively thin supporting sheath wall, water cooling of individual flextubes can be replaced by air cooling the composite core. That is, cooling water right after extrusion becomes unnecessary. Therefore, any water swellable elements used in the flextube unit are not damaged. Additionally, air cooling—as opposed to water cooling—the flextubes may help to improve the breakability and split of the supporting sheath, when it is desired to do so. That is, water cooling may undesirably change the mechanical behavior of some polymers, like those based on polypropylene (PP). Such undesirable change in mechanical behavior is eliminated by air cooling the flextubes after they have been stranded together.

Further, solid-stranding—wherein buffering and stranding are performed in the same process—shortens manufacturing time. That is, skipping the cooling stage—wherein individual flextubes are formed, which must then be combined in a stranding phase—increases production speed.

Moreover, solid-stranding forms a composite core which eliminates the need for separate binders to hold the flextubes together. Conventional cable designs produced by separate buffering and stranding processes may use a minimum of one binder—typically a polyester yarn—to secure all the loose tubes or flextubes during the tube stranding step. The binder allows the tubes to remain at desirable locations, such as in helically or SZ-stranded arrangements. However, the binders add costs in manufacturing material and equipment, as well as labor burden in the field to remove the binder prior to accessing the tubes. Because separate binders are not necessary in the solid-stranding process of the present invention, production speed is further increased and, at the same time, production cost is reduced. Further, such results in a lower cost optical cable, the tubes and optical fibers of which can be more easily accessed in the field thereby reducing labor costs involved with use and repair of the optical cable.

The solid-stranded flextubes may be continuously helically stranded in one direction, or may change stranding directions to form an SZ-stranded composite core. Further, the central element may be a water swellable yarn, a ripcord, or itself may be a flextube having optical fibers therein. Alternatively, the central element may be a metallic or other heat conducting member. In this case, the central element can be heated to further promote adhesion between the flextubes stranded around it, as well as to assist in sticking the flextubes to the central member.

Although a single central element is described above, such is not necessary. Instead, a plurality of flextubes may be stranded together without a central element. Further, the flextubes may be stranded together with water blocking elements such as yarns or powders. The flextube unit may then be wrapped in a water blocking tape, surrounded by armoring, and then encased in a sheath having strength members therein.

The individual flextubes which make up the solid-stranded flextube unit have sheaths made of conventional materials such as, for example, plastic material including polyethylene (PE), polybutylene terephthalate (PBT), polypropylene (PP), polyvinyl chloride (PVC), polyamide (PA), and/or ethylene vinyl acetate (EVA), as well as copolymers and/or blends of the above materials.

BRIEF DESCRIPTION OF THE DRAWINGS

The above and other objects and advantages of the present invention will become more apparent by describing in detail preferred embodiments thereof with reference to the accompanying drawings, wherein like reference numerals designate like or corresponding parts throughout the several views, and wherein.

DETAILED DESCRIPTION OF THE INVENTION

Figure 2:
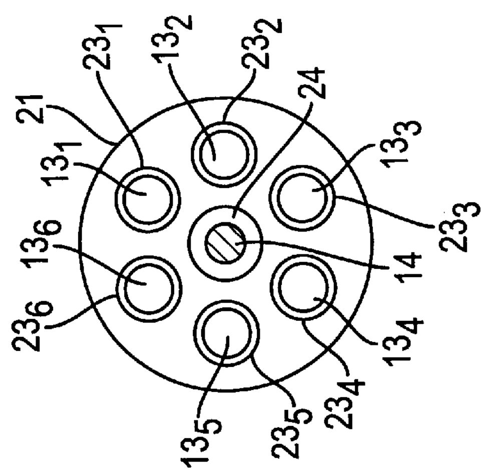
FIG. 2 is an end view of an extruder head for employment in the solid-stranding method of the present invention.

The method and apparatus of the present invention are directed to a new and novel solid-stranding process. The solid-stranding process of the present invention combines buffering and stranding operations, as well as performs stranding while the flextubes $\mathbf{13}_1$–$\mathbf{13}_n$ are still hot so that they adhere together without additional binders, thereby producing a solid-stranded flextube unit. The flextubes $\mathbf{13}_1$–$\mathbf{13}_n$ are formed by optical fibers $\mathbf{12}_1$–$\mathbf{12}_n$ that are supplied to an extruder 20, and supporting sheaths (also called flextube walls) $\mathbf{16}_1$–$\mathbf{16}_n$ formed by the extruder 20 around individual ones or groups of the optical fibers $\mathbf{12}_1$–$\mathbf{12}_n$. A central element 14 is supplied through the center of the extruder's head 21. A rotating pulling device, such as a caterpillar 30, helically strands the flextubes $\mathbf{13}_1$–$\mathbf{13}_n$ around the central element 14 as the flextubes $\mathbf{13}_1$–$\mathbf{13}_n$ cool down. That is, in the solid-stranding process of the present invention, buffering and stranding operations are performed together without a cooling stage therebetween so that the flextubes $\mathbf{13}_1$–$\mathbf{13}_n$ are brought together while their walls $\mathbf{16}_1$–$\mathbf{16}_n$ are at a temperature which is between the process temperature and the melting point of the material from which they are made. The process temperature is that of the material in the extruding die and, typically, is 20–50° C. higher than the melting point, wherein the melting point is a range of temperatures over which the material melts. Thus, because the flextubes $\mathbf{13}_1$–$\mathbf{13}_n$ are brought together wherein their walls $\mathbf{16}_1$–$\mathbf{16}_n$ are at a temperature between the process temperature and the melting point, they adhere to one another, as well as to the central element, thereby forming a solid-stranded flextube unit 1, wherein the flextube walls $\mathbf{16}_1$–$\mathbf{16}_n$ form a composite core of the flextube unit 1. The solid-stranded flextube unit 1 may then be jacketed by passing it through another extruder, or may be used without a jacket, thereby forming a solid-stranded flextube unit from which individual flextubes $\mathbf{13}_1$–$\mathbf{13}_n$ easily may be split.

Figure 1:
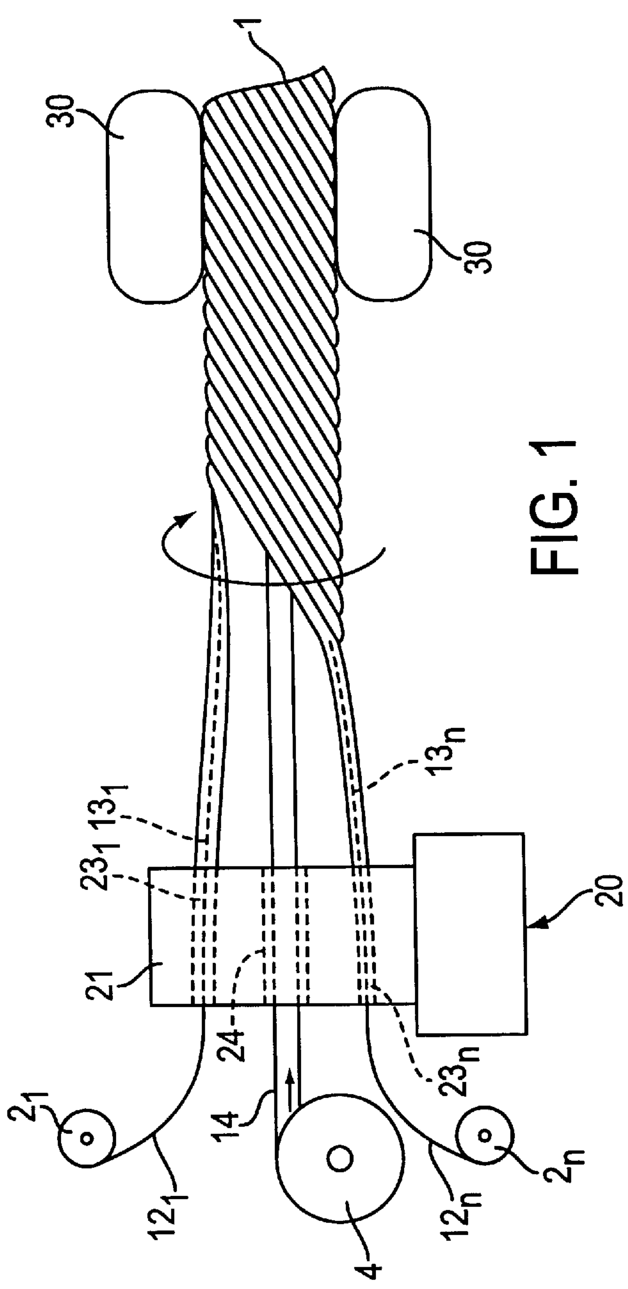
FIG. 1 is a schematic side view of an apparatus for implementing the solid-stranding method of the present invention.

The method and apparatus for forming a solid-stranded flextube unit 1 will be described with reference to FIGS. 1 and 2. The apparatus includes a supply drum 4 having a central element 14 thereon, supply drums $\mathbf{2}_1$–$\mathbf{2}_n$ having optical fibers $\mathbf{12}_1$–$\mathbf{12}_n$ thereon, an extruder 20 having an extruder head 21 with nozzles $\mathbf{23}_1$–$\mathbf{23}_n$, and a rotating caterpillar 30.

The supply drum 4 and the supply drums $\mathbf{2}_1$–$\mathbf{2}_n$ provide the central element 14 and the optical fibers $\mathbf{12}_1$–$\mathbf{12}_n$, respectively, to the extruder head 21. For convenience in explanation, and clarity of illustration, only one supply drum and one optical fiber are shown for each flextube. However, any suitable number of optical fibers may be used within one flextube and, therefore, a corresponding number of supply drums may be used to provide that number of optical fibers to the desired nozzle in the extruder head 21. Alternatively, a group of optical fibers may be supplied on a single supply drum for conveyance to a single nozzle. That is, although only one supply drum and one optical fiber per nozzle opening are shown for clarity of illustration, there may be more than one supply drum per nozzle opening, and each supply drum may contain a single optical fiber, a plurality of loose or bound optical fibers, a ribbon of optical fibers, a stack of ribbons, or any other suitable configuration of optical fibers.

The central element may be, for example, a central strength member made of metallic wires, plastic or glass-reinforced plastic rods or, glass yarns or rods, or any other suitably strong material that is tensile-load-resistant and compression-resistant so as to protect the solid-stranded flextube unit 1 from tensile and compressive loads. Further, when the central element conducts heat, it may be heated as the flextubes are twisted therearound to promote better adhesion between the central element and the flextubes. Alternatively, the central element may be omitted or may be replaced by another flextube—or group of flextubes—having optical fibers therein.

The extruder head includes a central bore 24 to receive the central element 14, and also includes nozzles $\mathbf{23}_1$–$\mathbf{23}_n$ to form flextube walls $\mathbf{16}_1$–$\mathbf{16}_n$ around the optical fibers $\mathbf{12}_1$–$\mathbf{12}_n$, thereby forming flextubes $\mathbf{13}_1$–$\mathbf{13}_n$. Alternatively, when it is desired to have a central element that is a flextube—or group of flextube—the bore 24 is also a nozzle, or nozzles, similar to nozzles $\mathbf{23}_1$–$\mathbf{23}_n$. The nozzles $\mathbf{23}_1$–$\mathbf{23}_n$ are arranged concentrically around the central bore 24. Although only six nozzles $\mathbf{23}_1$–$\mathbf{23}_6$ are shown, any number of nozzles may be present depending on the desired number of flextubes $\mathbf{13}_1$–$\mathbf{13}_n$ to be included in the solid-stranded flextube unit 1. Further, the nozzles $\mathbf{23}_1$–$\mathbf{23}_n$ extend through the extruder head 21 so as to guide the optical fibers $\mathbf{12}_1$–$\mathbf{12}_n$ as the flextube walls $\mathbf{16}_1$–$\mathbf{16}_n$ are formed around them to produce the flextubes $\mathbf{13}_1$–$\mathbf{13}_n$. The nozzles $\mathbf{23}_1$–$\mathbf{23}_n$ enable the entry of at least one optical fiber, $\mathbf{12}_1$ for example, that is hauled off from a corresponding supply drum $\mathbf{2}_1$. Of course, it is also possible to draw a plurality of optical fibers, ribbons, conductors, or cords through a corresponding nozzle. When a total of n flextubes is desired to be manufactured for a solid-stranded flextube unit 1, for example, a corresponding number of supply drums $\mathbf{2}_1$–$\mathbf{2}_n$ may be provided in accordance with the schematic illustration of FIG. 1. Alternatively, each of the supply drums $\mathbf{2}_1$–$\mathbf{2}_n$ may, in fact, be a plurality of supply drums so that any suitable number and configuration of optical fibers may be conveyed to each of the nozzles $\mathbf{23}_1$–$\mathbf{23}_n$. Further, it is not necessary for all the supply drums $\mathbf{2}_1$–$\mathbf{2}_n$ to be of the same configuration. That is, for example, supply drum $\mathbf{2}_1$ may include a plurality of supply drums, whereas supply drum $\mathbf{2}_2$ may only include one supply drum.

A hose-shaped flextube wall is produced by the extruder head 21 in the region of discharge from each of the nozzles $\mathbf{23}_1$–$\mathbf{23}_n$. These flextube walls $\mathbf{16}_1$–$\mathbf{16}_n$ contain at least one optical fiber $\mathbf{12}_1$–$\mathbf{12}_n$ on their inside so that the overall arrangement forms a group of solid-stranded flextubes $\mathbf{13}_1$–$\mathbf{13}_n$. The flextube walls $\mathbf{16}_1$–$\mathbf{16}_n$ may be made of conventional materials such as, for example, plastic material including polyethylene (PE), polybutylene terephthalate (PBT), polypropylene (PP), polyvinyl chloride (PVC), polyamide (PA), and/or ethylene vinyl acetate (EVA), as well as copolymers and/or blends of the above materials.

Figure 3:
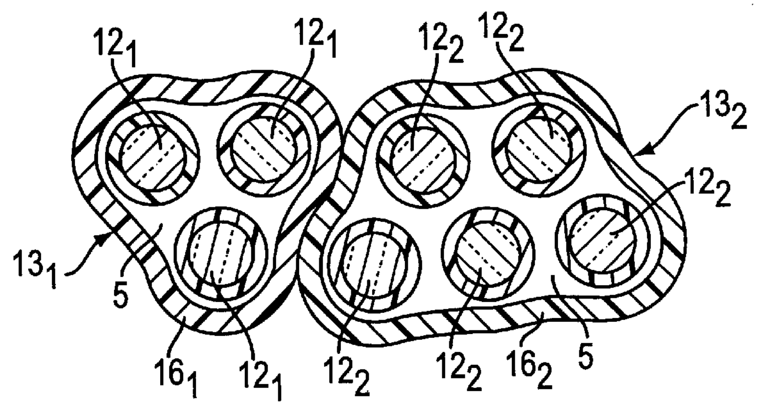
FIG. 3 is an enlarged transverse cross sectional view of the structure of two adjacent solid-stranded flextubes that are formed by the extruder head of FIG. 2.

FIG. 3 shows two adjacent flextubes $\mathbf{13}_1$ and $\mathbf{13}_2$ just after they have exited the extruder head 21 and have been brought together. Just after it has exited the extruder 20, the flextube $\mathbf{13}_1$ includes a flextube wall $\mathbf{16}_1$ and a plurality of optical fibers $\mathbf{12}_1$ therein. The flextube walls $\mathbf{16}_1$ and $\mathbf{16}_2$ respectively surround the optical fibers $\mathbf{12}_1$ and $\mathbf{12}_2$ in such a manner as to achieve mechanical coupling between the optical fibers. The is, the flextube wall $\mathbf{16}_1$ surrounds a plurality of optical fibers $\mathbf{12}_1$ so as to form a mechanical coupling between the plurality of optical fibers $\mathbf{12}_1$ within the flextube $\mathbf{13}_1$. Similarly, the flextube wall $\mathbf{16}_2$ surrounds a plurality of optical fibers $\mathbf{12}_2$ so as to form a mechanical coupling between the plurality of optical fibers $\mathbf{12}_2$ within the flextube $\mathbf{13}_2$. It should be noted that FIG. 3 is drawn on a greatly enlarged scale and, therefore, what appears as a relatively large space 5 between the optical fibers $\mathbf{12}_1$ in flextube $\mathbf{13}_1$, or between the optical fibers $\mathbf{12}_2$ in flextube $\mathbf{13}_2$, is in fact a space of very small size, or no space at all. Further, the flextube wall $\mathbf{16}_1$ is intended to keep the optical fibers $\mathbf{12}_1$ in close relation with one another so as to provide mechanical coupling between them, yet is thin enough that it easily may be torn by bare fingers to access optical fibers in the field, other simple tube access tool may also be used. Although only three optical fibers $\mathbf{12}_1$ are shown within the flextube $\mathbf{13}_1$, any number of optical fibers may be included, and they may be in any desired configuration such as, for example, a ribbon, or loose optical fibers. Further, in addition to, or instead of, optical fibers, one or more of the flextubes $\mathbf{13}_1$–$\mathbf{13}_n$ may contain electrical wires, other conductors, or cords. Although only two flextubes $\mathbf{13}_1$ and $\mathbf{13}_2$ are shown in detail, the structure of the remaining flextubes $\mathbf{13}_3$–$\mathbf{13}_n$ is similar and, therefore, has been omitted for the sake of clarity of illustration. However, although the structure of the flextubes $\mathbf{13}_1$–$\mathbf{13}_n$ is similar, they may contain different numbers of optical fibers, ribbons, conductors, or cords. That is, each of the flextubes $\mathbf{13}_1$–$\mathbf{13}_n$ does not need to include the same internal structure.

After the flextubes $\mathbf{13}_1$–$\mathbf{13}_n$ exit the extruder head 21, they are brought increasingly closer together until they lie on the outside surface of the central element 14. For the purpose of simplifying the illustration, the flextubes $\mathbf{13}_1$–$\mathbf{13}_n$ are shown at a greater distance from the central element 14 in FIG. 1, while in reality they at least one contacts at least a portion of the central element 14—as shown in FIGS. 4 and 5—at least in the region of the right-hand end of FIG. 1.

The rotating caterpillar, or other pulling device, 30 pulls the flextubes $\mathbf{13}_1$–$\mathbf{13}_n$ from the extruder head, and twists them as it pulls. The rotating caterpillar 30 turns in the direction of the arrow shown in FIG. 1 to helically twist the flextubes $\mathbf{13}_1$–$\mathbf{13}_n$ into a solid-stranded flextube unit 1. Alternatively, the rotating caterpillar could change directions of rotation to provide an SZ-stranded flextube unit. Further, the flextube walls $\mathbf{16}_1$–$\mathbf{16}_n$ are not completely cooled before they are twisted together and, therefore, they stick to one another as well as to at least portions of the central element 14, thereby forming a solid-stranded flextube unit 1. That is, the flextubes $\mathbf{13}_1$–$\mathbf{13}_n$ are brought together when they are still hot and soft, so that they stick to one another as well as to the central element 14. But because the flextube walls $\mathbf{16}_1$–$\mathbf{16}_n$ are thin, they air cool after the flextubes $\mathbf{13}_1$–$\mathbf{13}_n$ have been twisted together. The rotating caterpillar 30 is positioned at a distance from the extruder head so that the flextube walls $\mathbf{16}_1$–$\mathbf{16}_n$ sufficiently air cool between the time they are brought together to lie on the central element, and the time they enter the caterpillar 30. Additionally, the extruder 20 and caterpillar 30 are configured, and are positioned relative to one another, so that the flextube walls $\mathbf{16}_1$–$\mathbf{16}_n$ adhere to one another, as well as adhere to the central member 14, as they are twisted by the caterpillar 30. That is, the flextube walls $\mathbf{16}_1$–$\mathbf{16}_n$ are not completely cooled between the time they exit the extruder 20 and the time they are brought into contact with the central member 14. By way of further explanation, as discussed above, the flextubes $\mathbf{13}_1$–$\mathbf{13}_n$ are brought into contact with one another, and with the central element 14, when their walls $\mathbf{16}_1$–$\mathbf{16}_n$ are at a temperature which is between the process temperature and the melting point of the material from which the walls $\mathbf{16}_1$–$\mathbf{16}_n$ are made so that the walls $\mathbf{16}_1$–$\mathbf{16}_n$ adhere to one another without binders.

By buffering and stranding the flextubes $\mathbf{13}_1$–$\mathbf{13}_n$ in the above manner, i.e., solid-stranding the flextubes $\mathbf{13}_1$–$\mathbf{13}_n$, cooling water becomes unnecessary right after extrusion because the heat is used to adhere the flextubes $\mathbf{13}_1$–$\mathbf{13}_n$ to one another as well as to at least portions of the central element 14. By eliminating the necessity for cooling water, the risk of damaging any water swellable elements is significantly reduced in the solid-stranding process of the present invention.

Figure 4:
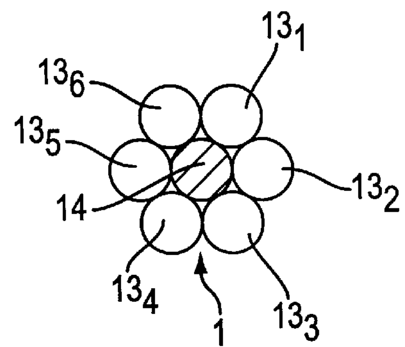
FIG. 4 is a schematic transverse cross sectional view of a solid-stranded flextube unit as produced by the method and apparatus of the present invention.
Figure 5:
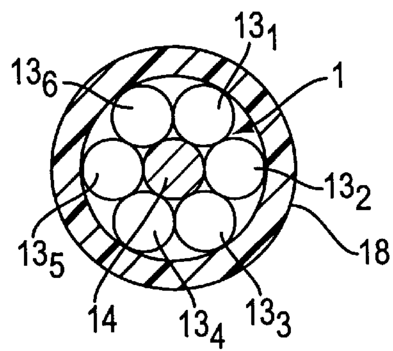
FIG. 5 is a schematic transverse cross sectional view of a solid-stranded flextube unit having a jacket around it, according to the present invention.

A schematic cross-section of the solid-stranded flextube unit 1, after the flextubes $\mathbf{13}_1$–$\mathbf{13}_6$ have been brought together so as to lie on at least portions of the central element 14, is shown in FIG. 4. Although the flextubes $\mathbf{13}_1$–$\mathbf{13}_6$ are shown as circular in cross section, they have, in reality, flextube walls $\mathbf{16}_1$–$\mathbf{16}_6$ more like the shape shown in the greatly enlarged view of FIG. 3. This cross-section is the same after the solid-stranded flextube unit 1 exits the caterpillar 30 and is wound on a take-up reel (not shown). The solid-stranded flextube unit 1 can be used in this configuration and, when so used, provides a flextube unit from which individual flextubes $\mathbf{13}_1$–$\mathbf{13}_6$ easily may be split for making connections, and the like. Further, for example, it may be desirable to use some of the flextubes for long haul applications, and others of the flextubes for shorter distance connections. Therefore, this configuration easily can be used in the situation where flextubes for shorter distance connections must be split away for splicing and branching, whereas the ones used for long haul applications continue through branching locations to flextube unit terminals. Thus, a portion of the solid-stranded flextube unit easily may be diverted into a local area, for example.

Alternatively, after the solid-stranded flextube unit 1 exits the caterpillar 30—and before it is stored on a take-up reel—it may be conveyed through another extruder (not shown) which applies a jacket 18 thereto. See FIG. 5. Again, in the schematic cross section of FIG. 5, although the flextubes $\mathbf{13}_1$–$\mathbf{13}_6$ are shown as circular in cross section, they have, in reality, flextube walls $\mathbf{16}_1$–$\mathbf{16}_6$ more like the shape shown in the greatly enlarged view of FIG. 3. In this configuration, the solid-stranded flextube unit 1 is stronger, and thus more suitable when the central element is not included or is replaced by a flextube, for example. Further, in this configuration, a water blocking material, such as a known type of water swellable yarn, a rip cord, or any other member may be provided within the jacket 18 and in the interstices between flextubes $\mathbf{13}_1$–$\mathbf{13}_n$. However, the flextubes $\mathbf{13}_1$–$\mathbf{13}_n$ are not as easily removed from the solid-stranded flextube unit when it is desired to do so.

Figure 6:
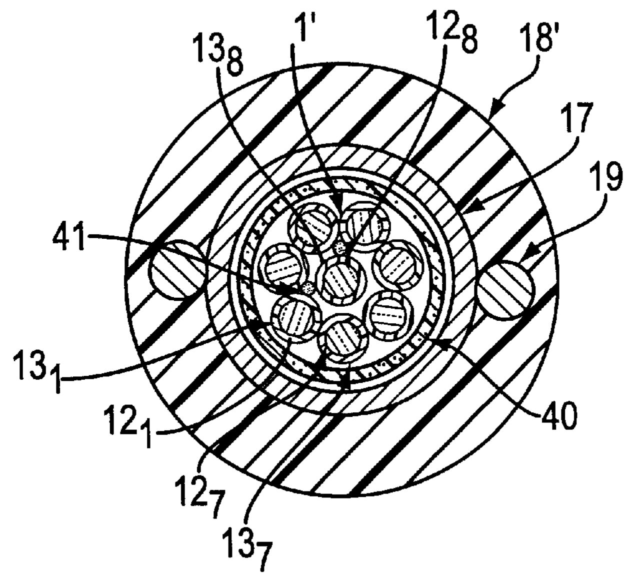
FIG. 6 is a schematic transverse cross sectional view of an armored, solid-stranded, flextube cable according to the present invention.
Figure 7:
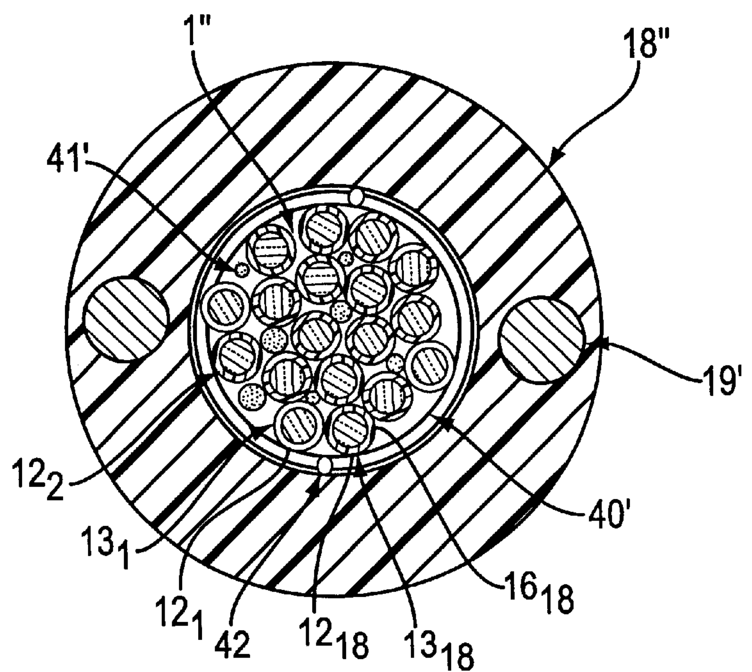
FIG. 7 is a schematic transverse cross sectional view of another embodiment of a solid-stranded flextube cable according to the present invention.

Alternative embodiments of an optical cable including a solid-stranded flextube unit as made according to the method of the present invention are shown schematically in cross section in FIGS. 6 and 7. Again, in the schematic cross sectional views of FIGS. 6 and 7, although the flextubes $\mathbf{13}_1$–$\mathbf{13}_6$ are shown as circular in cross section, they have, in reality, flextube walls $\mathbf{16}_1$–$\mathbf{16}_6$ more like the shape shown in the greatly enlarged view of FIG. 3. Also, the spaces, or interstices, between the solid-stranded flextubes are exaggerated for clarity.

The optical cable shown in FIG. 6 includes a solid-stranded flextube unit 1' made of eight flextubes $\mathbf{13}_1$–$\mathbf{13}_8$, each having a plurality of optical fibers $\mathbf{12}_1$–$\mathbf{12}_8$. That is, each flextube may have one or more optical fibers therein. Flextubes $\mathbf{13}_1$–$\mathbf{13}_7$ surround a central flextube $\mathbf{13}_8$, which replaces the central element 14 of the previous embodiments. The flextubes $\mathbf{13}_1$–$\mathbf{13}_8$, form interstices therebetween, and are held together without binders due to their walls adhering to one another. Further, water blocking elements 41, such as yarns or powders, are included within the interstices of the flextubes $\mathbf{13}_1$–$\mathbf{13}_8$. The solid-stranded flextube unit 1' is then surrounded by a water blocking tape 40, armoring 17, and a sheath 18'. The sheath 18' has strength members 19 therein. The strength members 19 may be, for example, steel wires. Moreover, the sheath 18' and the strength members 19 may be made of any materials conventionally used for such purposes.

The optical cable shown in FIG. 7 includes a solid-stranded flextube unit 1" made of eighteen flextube units $\mathbf{13}_1$–$\mathbf{13}_{18}$, each having a plurality of optical fibers $\mathbf{12}_1$–$\mathbf{12}_8$ within a flextube wall as $\mathbf{16}_{18}$, for example, wherein no single central element is present. Instead, the flextube units $\mathbf{13}_1$–$\mathbf{13}_{18}$ are bundled and twisted together so as to form interstices therebetween, wherein the walls of the flextubes adhere to one another without binders. Again, each flextube may have one or more optical fibers therein, and the interstices are shown in an exaggerated manner for clarity. Further, water blocking elements 41', such as yarns or powders, are positioned in the interstices between the flextubes $\mathbf{13}_1$–$\mathbf{13}_6$, and are bundled and twisted together therewith. The solid-stranded flextube unit 1" is then surrounded by a water blocking tape 40', and a sheath 18" having strength members 19' therein. The-sheath 18" and the strength members 19' may be made of any conventional materials used for such purposes. Further, the optical cable shown in FIG. 7 includes ripcords 42 beneath, or in, the water blocking tape 40' layer to facilitate access to the flextubes $\mathbf{13}_1$–$\mathbf{13}_{18}$.

It is contemplated that numerous modifications may be made to the method and apparatus for solid-stranding a flextube unit of the present invention without departing from the spirit and scope of the invention as defined in the following claims.

I claim:

1. An optical cable comprising:

a solid-stranded flextube unit having a plurality of flextubes with interstices therebetween, each of said plurality of flextubes having a flextube wall, wherein at least two of said flextube walls are adhered to one another without a binder, wherein said flextubes are formed with an extruder and twisted together, said flextubes being at a temperature greater than the melting point of the flextubes when they are twisted together, and said flextubes adhering to each other when they have cooled to the melting temperature.

2. The optical cable according to claim 1, further comprising a sheath surrounding said solid-stranded flextube unit.

3. The optical cable according to claim 2, further comprising at least one water blocking element in at least one of said interstices.

4. The optical cable according to claim 2, further comprising a water blocking tape between said plurality of flextubes and said sheath.

5. The optical cable according to claim 2, further comprising an armoring between said plurality of flextubes and said sheath.

6. The optical cable according to claim 2, further comprising at least one ripcord between said plurality of flextubes and said sheath.

7. The optical cable according to claim 2, further comprising strength members in said sheath.

8. The optical cable according to claim 1, wherein the flextubes walls are not exposed to water cooling before they are adhered to one another.

9. The optical cable according to claim 1, wherein when said flextubes are twisted together, they are continuously twisted in one direction so as to provide a helically stranded flextube unit.

10. The optical cable according to claim 1, wherein when said flextubes are twisted together, they are first twisted in one rotational direction and second twisted in an opposite direction so as to provide an SZ-stranded flextube unit.

11. The optical cable according to claim 1, wherein said flextube unit further comprises a central element, and wherein said flextubes are formed concentrically around said central element.

12. The optical cable according to claim 11, wherein when said flextubes are twisted together, they are twisted so that said flextube walls lie on said central element and adhere to said central element.

13. The optical cable according to claim 11, wherein said central element is heated before said flextubes are formed around it.

14. The optical cable according to claim 1, further comprising a jacket; wherein a first of said flextubes is located at a central position in said flextube unit, the remaining flextubes are formed concentrically around said first flextube, and the jacket is provided around said plurality of flextubes.

15. The optical cable according to claim 1, wherein the temperature of said flextube walls, when the flextubes are twisted together, is between a process temperature and the melting point.

* * * * *